(12) United States Patent
Menges et al.

(10) Patent No.: US 8,864,235 B2
(45) Date of Patent: Oct. 21, 2014

(54) SEAT ASSEMBLY HAVING A GUIDE BUSHING

(75) Inventors: Michael Menges, Pliening (DE);
Karsten Mueller, Ingolstadt (DE);
Frank Kunert, Ingolstadt (DE); Achim Tscherbner, Ingolstadt (DE); Bernd Rolf Schwerma, Neuberg (DE)

(73) Assignee: Lear Corporation, Southfield, MI (US)

( * ) Notice: Subject to any disclaimer, the term of this patent is extended or adjusted under 35 U.S.C. 154(b) by 30 days.

(21) Appl. No.: 13/151,541

(22) Filed: Jun. 2, 2011

(65) Prior Publication Data

US 2012/0007403 A1    Jan. 12, 2012

(30) Foreign Application Priority Data

Jul. 7, 2010 (DE) .......................... 10 2010 031 048

(51) Int. Cl.
*A47C 7/38* (2006.01)
*B60N 2/48* (2006.01)

(52) U.S. Cl.
CPC ........... *A47C 7/38* (2013.01); *B60N 2002/4897* (2013.01); *B60N 2/4808* (2013.01)
USPC ............................ 297/404; 297/391; 297/410

(58) Field of Classification Search
USPC ................. 297/391, 410, 404, 463.1
See application file for complete search history.

(56) References Cited

U.S. PATENT DOCUMENTS

| 5,080,437 | A | * | 1/1992 | Pesta et al. ..................... 297/410 |
| 5,180,207 | A | * | 1/1993 | Schmidt ......................... 297/408 |
| 5,695,252 | A | * | 12/1997 | Schmidt et al. ................ 297/408 |
| 5,788,250 | A | * | 8/1998 | Masters et al. ................. 297/410 |
| 5,876,071 | A | * | 3/1999 | Aldridge ........................ 285/321 |
| 5,992,939 | A | | 11/1999 | Gass et al. |
| 6,012,777 | A | * | 1/2000 | Wege et al. .................... 297/410 |
| 6,733,079 | B2 | * | 5/2004 | Gans et al. ..................... 297/410 |
| 7,165,814 | B2 | * | 1/2007 | Gans et al. ..................... 297/391 |
| 7,370,915 | B2 | | 5/2008 | Droche |
| 8,075,060 | B2 | * | 12/2011 | Gans .............................. 297/410 |

FOREIGN PATENT DOCUMENTS

| CN | 1137987 A | | 12/1996 |
| CN | 102917619 A | | 2/2013 |
| DE | 19608851 A1 | | 9/1997 |
| DE | 19945585 A1 | | 3/2001 |
| DE | 102005043811 A1 | | 5/2006 |
| DE | 102007010064 A1 | | 9/2008 |
| WO | WO2008142501 | * | 5/2008 |
| WO | 2011155926 A1 | | 12/2011 |

OTHER PUBLICATIONS

German Patent and Trademark Office, Office Action for corresponding German Patent Application DE 10 2010 031 048.4-16 mailed Dec. 9, 2010.
State Intellectual Property of China, First Office Action for corresponding Chinese Patent Application No. 201110185852.9 mailed Feb. 8, 2013.

* cited by examiner

*Primary Examiner* — David R Dunn
*Assistant Examiner* — Richard Lowry
(74) *Attorney, Agent, or Firm* — Brooks Kushman P.C.

(57) ABSTRACT

A seat assembly having a guide bushing. The guide bushing has a body and a biasing member. The body has an opening for receiving a support post and first and second engagement features that are configured to flex. The biasing member exerts a biasing force on the first and second engagement features to bias the first and second engagement features.

20 Claims, 4 Drawing Sheets ions to DE 10 2010 031 048.4, filed Jul. 7, 2010, which is hereby incorporated by reference in its entirety.

BACKGROUND OF THE INVENTION

Field of the Invention

The present invention relates to a seat assembly having a guide bushing.

SUMMARY OF THE INVENTION

In at least one embodiment, a seat assembly is provided. The seat assembly includes a support post adapted to be disposed on a seat back and a guide bushing. The guide bushing has a body and a biasing member. The body defines an opening for receiving the support post and has first and second engagement features that are configured to flex. The biasing member exerts a biasing force on the first and second engagement features to bias the first and second engagement features toward the support post.

In at least one embodiment, a seat assembly is provided. The seat assembly includes a head restraint assembly that has a support post and a headrest moveably disposed on the support post. The headrest includes a traverse member and a first guide bushing. The traverse member is disposed in the headrest and has a first support post opening that receives the support post. The first guide bushing is disposed on the traverse member and has an opening that receives the support post, first and second engagement features, and a biasing member. The first and second engagement features are spaced apart from each other and engage the support post. The first and second engagement features are configured to flex with respect to the opening. The biasing member is received by the first guide bushing and biases the first and second engagement features toward each other.

In at least one embodiment, a seat assembly is provided. The seat assembly includes a guide bushing that includes a one piece body and a spring. The one piece body has an opening for receiving a support post and first and second engagement features disposed adjacent to the opening that are configured to flex toward each other. The spring is disposed on an exterior surface of the body and biases the first and second engagement features toward each other.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
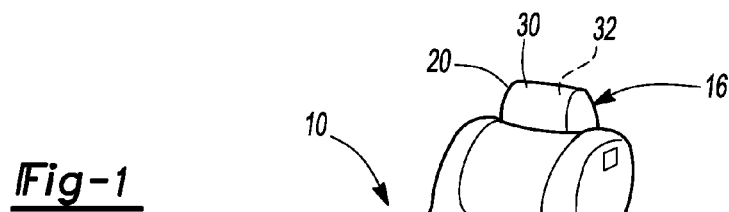
FIG. 1 is a perspective view of a seat assembly having a head restraint assembly.

Referring to FIG. 1, an exemplary seat assembly 10 is shown. The seat assembly 10 may be configured for use in a vehicle, such as a motor vehicle like a car or truck, or for non-automotive applications.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Figure 2:
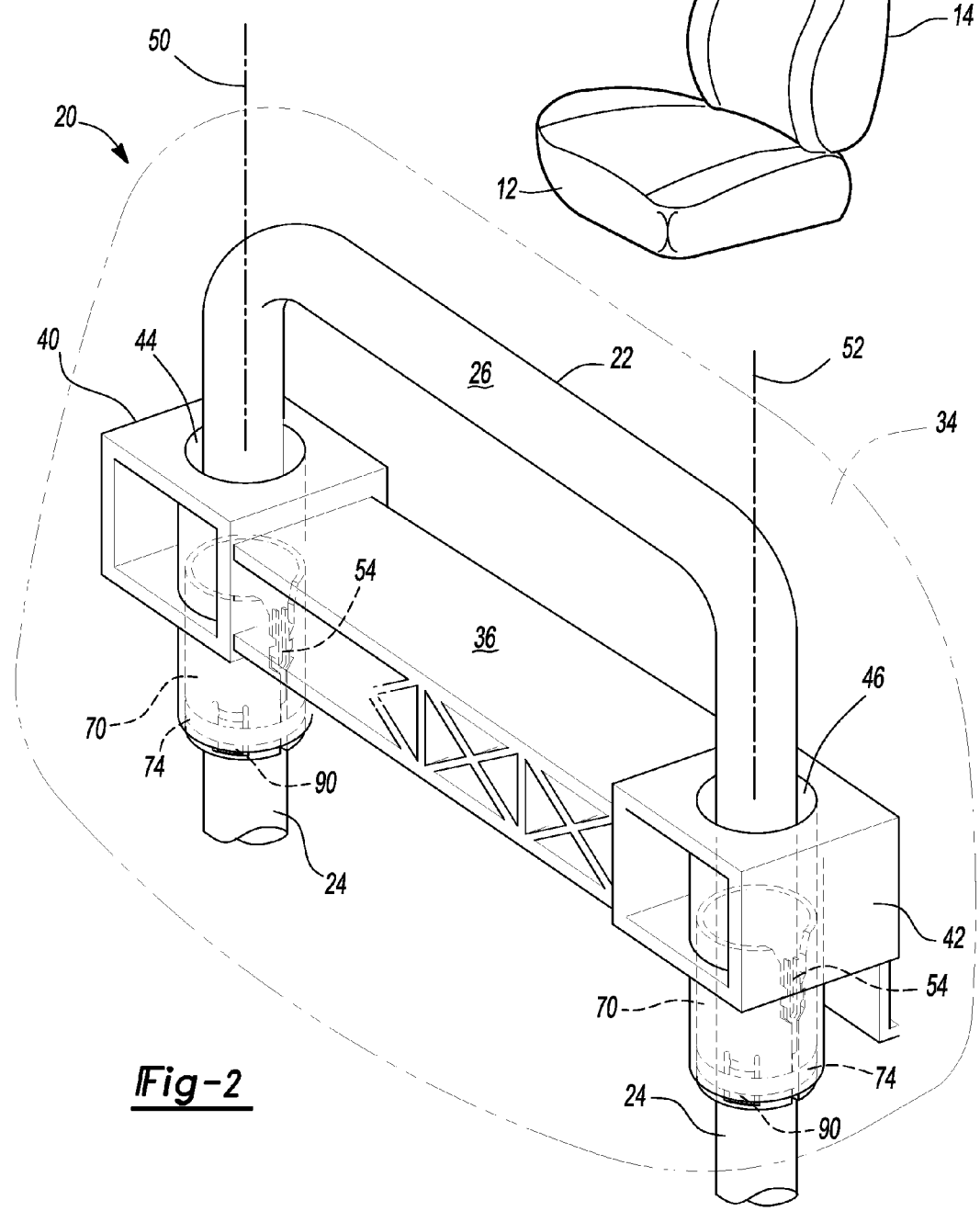
FIG. 2 is a fragmentary perspective view of a head restraint assembly.

Referring to FIG. 2, the head restraint assembly 16 may include a headrest 20 and one or more support posts 22. In at least one embodiment, the headrest 20 may be moveably disposed on the support post 22. Alternatively, the headrest 20 may be fixedly disposed on the support post 22 and the support post 22 may move with respect to the seat back 14. The support post 22 may be made of any suitable material or materials, such as a metal like an aluminum or steel alloy.

The support post 22 may include one or more lower portions 24 and an upper portion 26. In at least one embodiment, the lower and upper portions 24, 26 may be generally cylindrical tubes. The lower portion 24 may extend through the top of the seat back 14 and may be provided in a substantially linear or non-linear configuration. The upper portion 26 may or may not extend at an angle from the lower portion 24. For example, the upper portion 26 may extend between and may be integrally formed with two lower portions 24 in one or more embodiments.

Referring to FIGS. 1 and 2, the headrest 20 may be configured to support the head of an occupant of the seat assembly 10. The headrest 20 may include a trim cover 30, a cushion 32, a housing 34, and a traverse member 36.

The trim cover 30 may be provided on a visible exterior surface of the headrest 30. The trim cover 30 may be made of any suitable material or materials, such as a fabric, vinyl, leather, or the like. The trim cover 30 may cover the cushion 32, which may be disposed under at least a portion of the trim cover 30. The cushion 32 may be disposed proximate the housing 34, which may be provided to support the trim cover 30 and/or the cushion 32.

Referring to FIG. 2, the traverse member 36 may be provided with embodiments that have a headrest 20 that moves with respect to a support post 22. In such embodiments, the traverse member 36 may be disposed in or provided with the housing 34 and may be configured to move along the support post 22. The traverse member 36 may be disposed below the upper portion 26. As such, the upper portion 26 may engage the traverse member 36 to limit the range of movement of the traverse member 36. The traverse member 36 may be made of any suitable material, such as a polymeric material.

The traverse member 36 may include a first end 40 and a second end 42 disposed opposite the first end 40. A first support post opening 44 may be disposed proximate the first end 40. A second support post opening 46 may be disposed proximate the second end 42. In at least one embodiment, the first and second support post openings 44, 46 may be disposed along first and second axes 50, 52. The first and second axes 50, 52 may be disposed substantially parallel to each other. The first and second support post openings 44, 46 may be generally cylindrical and may be spaced apart from the support post 22 in one or more embodiments.

Figure 3:
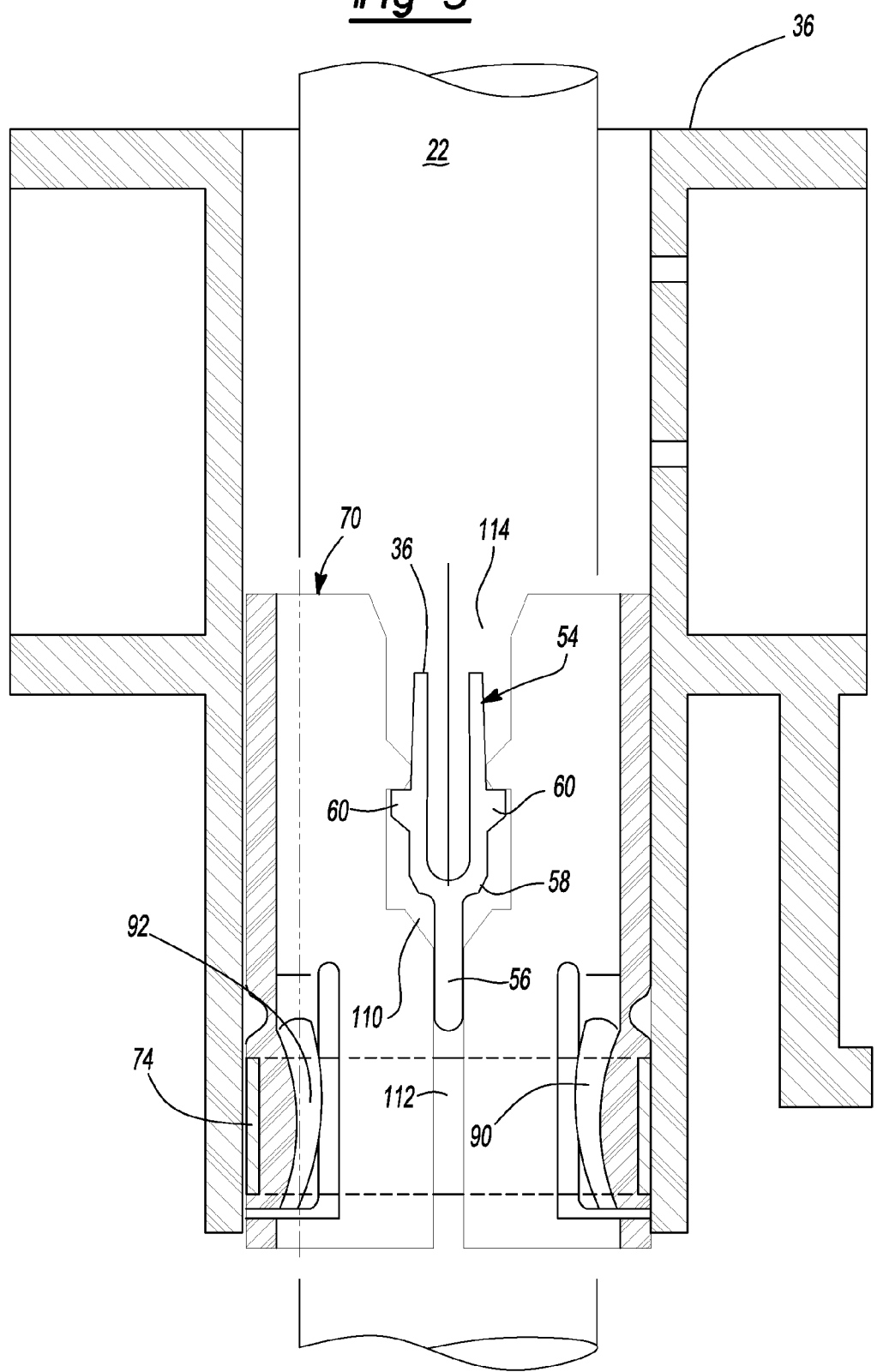
FIG. 3 is a section view of the head restraint assembly along section line 3-3.

Referring to FIGS. 2 and 3, the traverse member 36 may also include one or more retention features 54. The retention feature 54 may be provided to help hold a guide bushing in a stationary position with respect to the traverse member 36. The retention feature 54 may have any suitable configuration, such as a male configuration, a female configuration, or combinations thereof. The retention feature 54 may be disposed along a surface that may define at least a portion of a support post opening 44, 46 and may be configured as a clip or barb that may be integrally formed with the traverse member 36. Alternatively or additionally, the retention feature 54 may be an adhesive or a separate fastener, such as a pin or screw. In the embodiment shown, the retention feature 54 may include a first portion 56 and a second portion 58 that may extend from the first portion 56.

The first portion 56 may be generally linear and may engage the guide bushing to help inhibit rotation. The second portion 58 may include one or more protrusions 60 that may be provided with a tapered surface that facilitates installation of the guide bushing and an adjacent surface that helps inhibit removal or axial movement of the guide bushing. The second portion 58 may be generally U-shaped in one or more embodiments.

Figure 4:
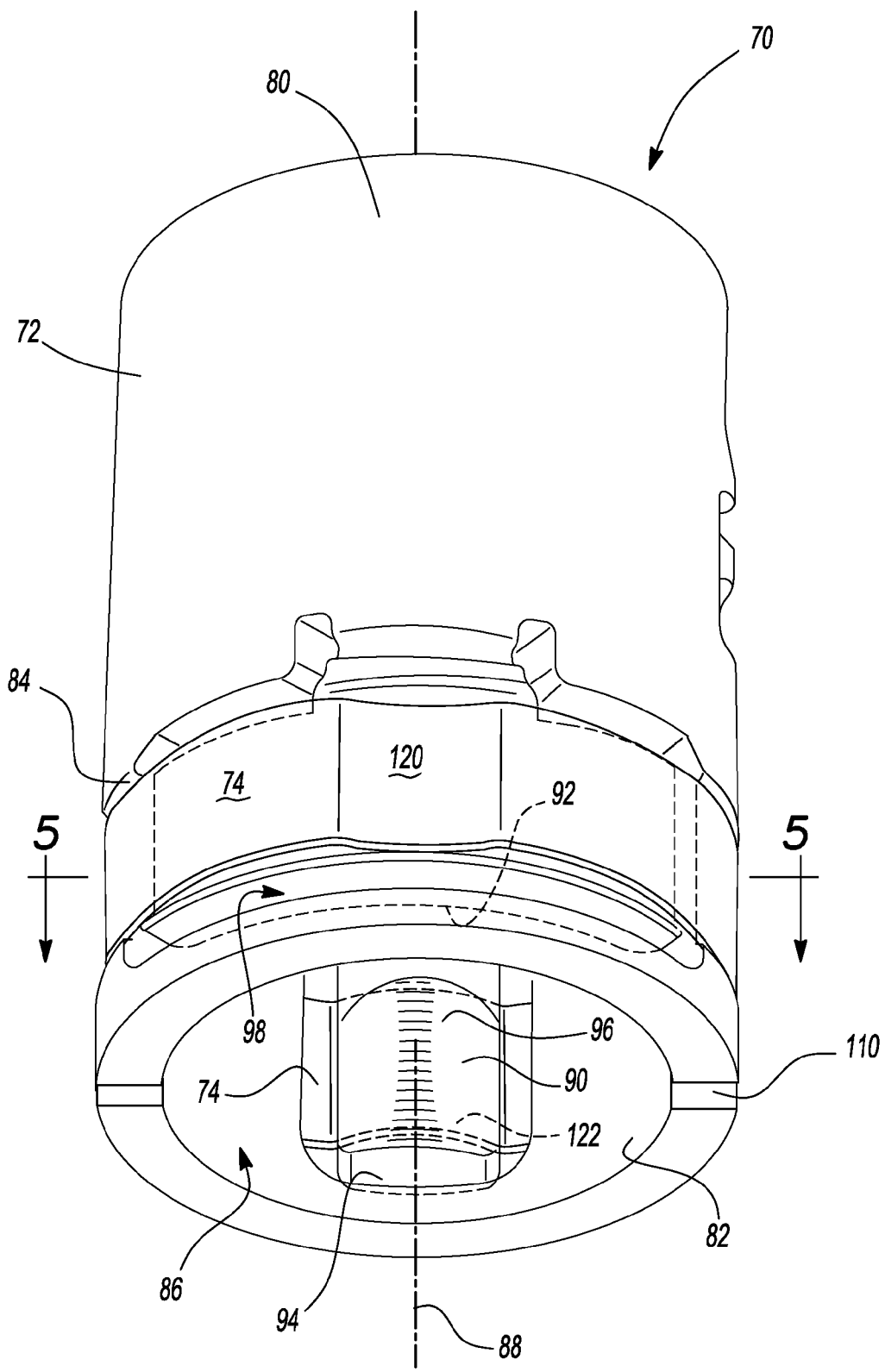
FIG. 4 is a perspective view of a guide bushing.
Figure 5:
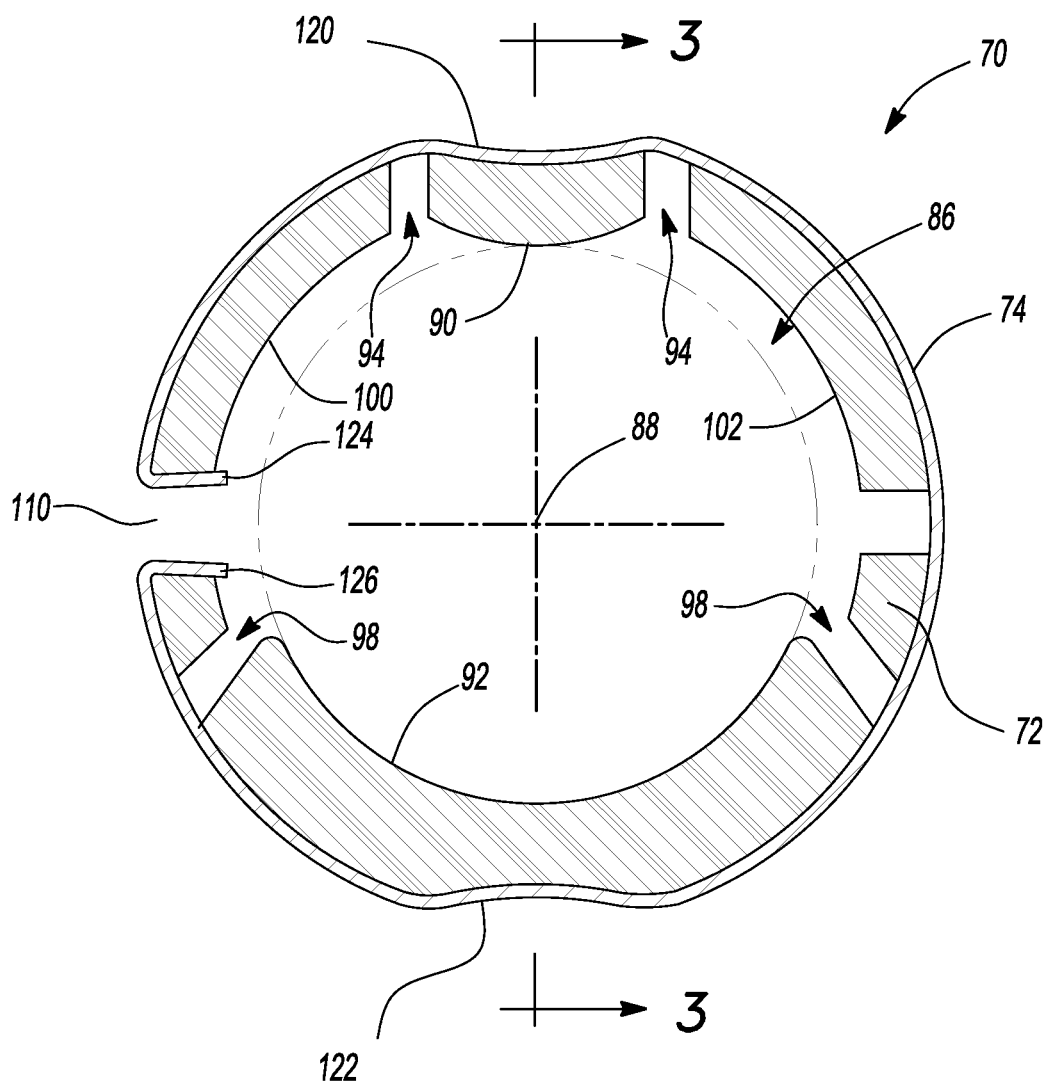
FIG. 5 is a section view of the guide bushing along section line 5-5.

Referring to FIGS. 3-5, an exemplary guide bushing 70 is shown in more detail. The guide bushing 70 may be configured to engage and facilitate movement associated with a support post 22. For instance, the guide bushing 70 may facilitate movement of the headrest 20 with respect to the support post 22 when disposed in a headrest 20 and may facilitate movement of the support post 22 with respect to the seat back 14 when disposed in a seat back 14. The guide bushing 70 may include a body 72 and a biasing member 74.

The body 72 may be made of any suitable material, such as a polymeric material. In addition, the body 72 may be provided as a unitary component having a one piece construction. In at least one embodiment, the body 72 may have a generally tubular or a generally hollow cylindrical configuration. The body 72 may include a first body surface 80 and a second body surface 82 disposed opposite the first body surface 80.

The first body surface 80 may include a groove 84 that may extend around the body 72. The groove 84 may receive the biasing member 74 as will be discussed in more detail below.

The second body surface 82 may at least partially define an opening 86 for receiving the support post 22. The opening 86 may be disposed along an axis 88 and may be at least partially defined by a first engagement feature 90 and a second engagement feature 92.

The first engagement feature 90 may be configured to flex with respect to the opening 86. The first engagement feature 90 may be integrally formed with the body 72 and may be partially bounded by a window or gap 94. The gap 94 may extend from the first body surface 80 to the second body surface 82 and may be provided on multiple sides of the first engagement feature 90 to facilitate flexing of the first engagement feature 90. The first engagement feature 90 may also include a contact pad 96 that may extend toward the axis 88 and may extend into the opening 86 to engage the support post 22.

The second engagement feature 92 may be spaced apart from the first engagement feature 90. In at least one embodiment, the second engagement feature 92 may be disposed generally opposite the first engagement feature 90 and may be larger than the first engagement feature 90. As such, the second engagement feature 92 may extend around and engage a larger portion of the surface of the support post 22 than the first engagement member 90. The second engagement feature 92 may also be configured to flex with respect to the opening 86. The second engagement feature 92 may be integrally formed with the body 72 and may be partially bounded by a window or gap 98. The gap 98 may extend from the first body surface 80 to the second body surface 82 and may be provided on multiple sides of the second engagement feature 92 to facilitate flexing. The second engagement feature 92 may be configured with or without a contact pad. In addition, the configuration and flexure of the first and second engagement features 90, 92 may help accommodate a support post 22 having a curved or non-linear configuration.

Referring to FIG. 5, first and second clearance surfaces 100, 102 may be provided on the body 72 that may be disposed between the first and second engagement features 90, 92. The first and second clearance surfaces 100, 102 may be spaced apart from the support post 22 to reduce friction therebetween.

A slot 110 may be provided in the body 72 that may extend from the first body surface 80 to the second body surface 82. In addition, the slot 110 may extend substantially parallel to the axis 88 and may extend between opposing end surfaces of the body 72. The slot 110 may be configured to engage the retention feature 54 of the traverse member 36. In at least one embodiment, the slot 110 may include a first slot portion 112 and a second slot portion 114. The first slot portion 112 may at least partially receive the first portion 56 of the retention feature 54 as is best shown in FIG. 3. The second slot portion 114 may be configured to receive and mate with the second portion 58 of the retention feature 54. The first slot portion 112 may be narrower or have a smaller gap than the second slot portion 114 in one or more embodiments.

The biasing member 74 may exert a biasing force on the first and second engagement features 90, 92. The biasing member 74 may have any suitable configuration. For instance, the biasing member 74 may be configured as a spring and may be made of any suitable material, such as a metal or a metal alloy. The biasing member 74 may be at least partially disposed in the groove 84 and may include first and second indentations 120, 122 that engage the first and second engagement features 90, 92, respectively.

The first and second indentations 120, 122 may be disposed opposite each other. In addition, the first and second indentations 120, 122 may be disposed opposite each other to provide opposing compressive forces. In at least one embodiment, the biasing member 74 may provide a substantially constant compressive force and/or a substantially continuous compressive force that may help hold the headrest 20 in position with respect to the support post 22 or the support post 22 in position with respect to the seat back 14 under various temperatures in the absence of a sufficient actuation force. A sufficient actuation force may be a force applied to the head restraint assembly 16 that may actuate the headrest 20 along the support post 22 (or may actuate the support post 22 with respect to the seat back 14). As such, the guide bushing 70 may be configured to engage the support post 22 such that the headrest 20 or the support post 22 remains in position (e.g., does not drop down) unless a sufficient actuation force is applied. In addition, the guide bushing 70 may be configured to permit the headrest 20 to move along the support post 22 or the support post 22 to move with respect to the seat back 14 with substantially equal actuation forces in different directions of motion (e.g., up or down). An actuation force may be manually applied by a seat occupant.

The biasing member 74 may also include a first end 124 and a second end 126 disposed opposite the first end 124. The first and second ends 124, 126 may be configured to engage the body 72. For example, the first and second ends 124, 126 may extend into the slot 110 and engage or hook on to the body 72 to help hold the biasing member 74 in a desired position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a support post adapted to be disposed on a seat back; and
   a guide bushing including:
      a body that defines an opening for receiving the support post, the body having first and second engagement features that extend from a first body surface to a second body surface that is disposed opposite the first body surface and are configured to flex and engage the support post and a slot that is spaced apart from and not disposed adjacent to the first and second engagement features; and
      a biasing member that engages the first body surface and exerts a biasing force on the first and second engagement features to bias the first and second engagement features toward the support post, wherein the biasing member has first and second ends that are disposed opposite each other and that extend through the slot toward the support post.

2. The seat assembly of claim 1 wherein the body includes a groove that receives the biasing member.

3. The seat assembly of claim 1 wherein the slot extends from the first body surface to the second body surface, wherein the slot is configured to engage a retention feature to inhibit movement of the guide bushing with respect to the support post.

4. The seat assembly of claim 3 wherein the retention feature is disposed on a traverse member that is disposed in a headrest, the traverse member having a support post opening for receiving the support post.

5. The seat assembly of claim 1 wherein the biasing member has first and second indentations that engage the first and second engagement features, respectively.

6. The seat assembly of claim 5 wherein the first and second indentations are disposed opposite each other and are both disposed between and spaced apart from the first and second ends.

7. The seat assembly of claim 1 wherein the guide bushing is disposed in a headrest that is moveably disposed on the support post.

8. The seat assembly of claim 1 wherein the body includes a clearance surface that extends between the first and second engagement features and is spaced apart from the support post.

9. The seat assembly of claim 1 wherein the first and second engagement features are the only two surfaces of the guide bushing that are configured to engage the support post.

10. A seat assembly comprising:
    a head restraint assembly having a support post and a headrest moveably disposed on the support post, the headrest including:
       a traverse member disposed in the headrest that has a first support post opening that receives the support post; and
       a first guide bushing disposed on the traverse member, the first guide bushing including:
          an opening that receives the support post;
          first and second engagement features disposed proximate the opening that are spaced apart from each other and engage the support post, the first and second engagement features being configured to flex; and
       a biasing member received by the first guide bushing that biases the first and second engagement features toward each other, wherein the biasing member has first and second ends that are disposed in a slot in the first guide bushing,
    wherein the slot is spaced apart from the first and second engagement features, and
    wherein the first and second ends extend into the slot and toward the support post.

11. The seat assembly of claim 10 wherein the first guide bushing is disposed in the first support post opening.

12. The seat assembly of claim 10 further comprising a second guide bushing, wherein the first and second guide bushings are disposed on the traverse member and spaced apart from each other.

13. The seat assembly of claim 10 wherein the first guide bushing holds the headrest in a stationary position.

14. The seat assembly of claim 10 wherein the traverse member includes a retention feature disposed in the first support post opening and wherein the retention feature is disposed in the slot to hold the guide bushing in a fixed position.

15. The seat assembly of claim 14 wherein the slot includes a first slot portion and a second slot portion disposed adjacent to the first slot portion, wherein the first slot portion is narrower than the second slot portion.

16. A seat assembly comprising:
    a guide bushing including:
       a body having an opening for receiving a support post, first and second engagement features disposed adjacent to the opening and that extend from an exterior surface of the body to an interior surface that is disposed opposite the exterior surface and that are configured to flex toward each other, and a slot that extends from the exterior surface to the interior surface and that is spaced apart from and not disposed adjacent to the first and second engagement features; and
       a spring disposed on the exterior surface of the body that biases the first and second engagement features toward each other, wherein the spring has first and second ends that are disposed opposite each other and that are both received in the slot.

17. The seat assembly of claim 16 wherein the spring is disposed in a groove that extends around the exterior surface.

18. The seat assembly of claim 17 wherein the spring includes a first end and a second end disposed opposite the first end, wherein the first and second ends are spaced apart from each other and disposed in the slot.

19. The seat assembly of claim 16 wherein the spring includes first and second indentations that are disposed opposite each other and that engage the first and second engagement features, respectively.

20. The seat assembly of claim 16 wherein the body includes first and second gaps disposed around at least three sides of the first and second engagement features, respectively.

* * * * *